United States Patent
Zhang (10) Patent No.: US 11,159,668 B2
(45) Date of Patent: Oct. 26, 2021

(54) METHOD FOR INFORMATION PROCESSING AND ELECTRONIC DEVICE

(71) Applicant: BEIJING XIAOMI MOBILE SOFTWARE CO., LTD., Beijing (CN)

(72) Inventor: Pengfei Zhang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/744,238

(22) Filed: Jan. 16, 2020

(65) Prior Publication Data

US 2021/0120116 A1 Apr. 22, 2021

(30) Foreign Application Priority Data

Oct. 22, 2019 (CN) .......................... 201911007712.5

(51) Int. Cl.
*H04M 1/72412* (2021.01)
*H04W 4/80* (2018.01)
*G06F 1/16* (2006.01)
*H04B 1/3827* (2015.01)

(52) U.S. Cl.
CPC ........ *H04M 1/72412* (2021.01); *G06F 1/163* (2013.01); *H04B 1/385* (2013.01); *H04W 4/80* (2018.02)

(58) Field of Classification Search
CPC . H04M 1/7253; H04M 1/72412; H04W 4/80; H04B 1/385; G06F 1/163

USPC .......................................... 455/557
See application file for complete search history.

(56) References Cited

U.S. PATENT DOCUMENTS

| | | | |
|---|---|---|---|
| 9,807,544 B2* | 10/2017 | Lam | ................ H04W 4/80 |
| 2014/0164520 A1 | 6/2014 | Fan | |
| 2015/0020081 A1 | 1/2015 | Cho et al. | |
| 2016/0277557 A1 | 9/2016 | Yang et al. | |
| 2016/0360021 A1 | 12/2016 | Cho et al. | |
| 2020/0228599 A1 | 7/2020 | Fan | |
| 2020/0387758 A1* | 12/2020 | Kobayashi | ......... G06K 9/00362 |

FOREIGN PATENT DOCUMENTS

| | | |
|---|---|---|
| CN | 105306672 A | 2/2016 |
| CN | 105847576 A | 8/2016 |

OTHER PUBLICATIONS

First Office Action of the Chinese application No. 201911007712.5, dated Aug. 4, 2020.
Supplementary European Search Report in the European application No. 20153119.1, dated Aug. 25, 2020.

* cited by examiner

*Primary Examiner* — Eugene Yun
(74) *Attorney, Agent, or Firm* — Syncoda LLC; Feng Ma (57) ABSTRACT

A method for information processing includes receiving an operation request from a wearable device; determining an operation, requested by the operation request, to be executed on the electronic device; and executing the operation on the electronic device.

12 Claims, 5 Drawing Sheets

METHOD FOR INFORMATION PROCESSING AND ELECTRONIC DEVICE

CROSS-REFERENCE TO RELATED APPLICATION

The present application claims priority to Chinese patent application No. 201911007712.5 filed on Oct. 22, 2019, the disclosure of which is hereby incorporated by reference in its entirety.

BACKGROUND

Nowadays, mobile electronic devices such as mobile phones, laptops and smart wearable devices have been widely applied in various fields like communications, entertainment and education. Since mobile electronic devices are easy to carry, users can use mobile electronic devices anywhere at any time. For example, a notification message from a mobile phone can be received with a smart wearable device. However, a user can merely view the received notification message through the smart wearable device.

SUMMARY

The disclosure relates generally to the field of computer communication, and more specifically to a method for information processing, an electronic device and a storage medium.

A method for information processing, and an electronic device are provided in the disclosure.

According to a first aspect of embodiments of the disclosure, a method for information processing is provided, applied to an electronic device, and including:

receiving an operation request from a wearable device;

determining an operation, requested by the operation request, to be executed on the electronic device; and executing the operation on the electronic device.

According to a second aspect of embodiments of the disclosure, a method for information processing is provided, applied to a wearable device, and including:

monitoring a preset operation acting on display information displayed on the wearable device; and sending an operation request to an electronic device in response to the preset operation being detected, wherein the operation request is used for instructing the electronic device to execute, based on the display information, the operation requested by the operation request.

According to a third aspect of embodiments of the disclosure, an electronic device is provided, including:

a processor; and a memory, configured to store instructions executable by the processor, wherein the processor is configured to implement, during execution, blocks in the method for information processing according to the first and second aspect above.

It should be understood that the general description above and detailed description later are merely exemplary and explanatory, and are not intended to restrict the disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Figure 1:
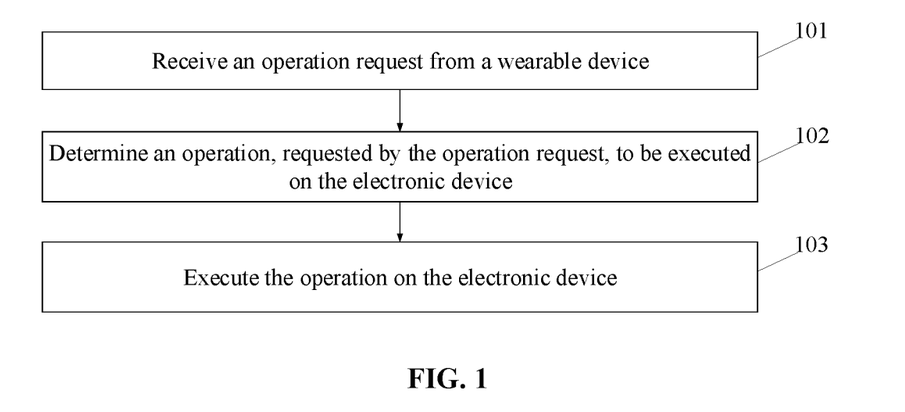
FIG. 1 illustrates a flowchart of a method for information processing according to some embodiments of the disclosure.

FIG. 1 illustrates a flowchart of a method for information processing according to some embodiments of the disclosure. As illustrated in FIG. 1, the method is applied to an electronic device. The electronic device includes a mobile terminal or a non-mobile terminal. By way of example, the mobile terminal may include a mobile phone, a laptop, a vehicle-mounted terminal, etc. The non-mobile terminal may include a smart television, a smart home device, etc., so as to simulate the generation of a user operation and control the electronic device in a non-invasive manner through a wearable device worn on a user without developing an interface between an application and a system. The method includes the following blocks.

In block 101, an operation request is received from a wearable device.

In block 102, an operation, requested by the operation request, to be executed on the electronic device is determined.

In block 103, the operation is executed on the electronic device.

The wearable device includes a smart watch, a wristband, etc. In some embodiments, a communication connection can be established between an electronic device and a wearable device; and when the communication connection between the electronic device and the wearable device is successfully established, an operation request can be sent to the electronic device based on the wearable device so that the electronic device executes, based on the received operation request, a corresponding operation. The communication connection may be a wired connection, a network connection, a short-range wireless connection or the like, which will not be specified herein, as long as data transmission between the electronic device and the wearable device can be implemented. The operation request contains request information of an operation requested to be executed on the electronic device, for example, information related to a request for opening a push message on the electronic device.

In the embodiments of the disclosure, an electronic device can receive an operation request from a wearable device, determine an operation, requested by the operation request, to be executed on the electronic device, and execute the operation on the electronic device. As such, a user can directly execute, based on the operation request from the wearable device, the corresponding operation, for example opening a push message, on the electronic device.

When the electronic device executes the operation corresponding to a push message of an application installed on the electronic device, the technical solutions provided in the present application have the following benefits. At a first aspect, compared with the solution where a user sees a push message on the wearable device and then enters an electronic device to execute an operation corresponding to the push message, the solutions of the present application enable the user to quickly process the push message on the electronic device. At a second aspect, by means of the technical solutions provided in the present application, the electronic device can receive an operation request from the wearable device and execute a corresponding operation; as such, the execution of the user operation is achieved in an non-invasive manner, and there is no need for the system of the electronic device to specifically establish an interface with the corresponding application. At a third aspect, since an operation executed by the electronic device is a simulated user operation, operations such as establishing an interface, such as an API, can be conducted during development or installation of a new application. Therefore, the difficulty in developing a new application is reduced, and the degree of coupling between the system and the application is reduced.

In some embodiments, the method further includes a block of sending a first information identifier of a push message, and the push message to the wearable device. The block 101 includes: receiving, from the wearable device, the operation request carrying a second information identifier. The block 103 includes: executing, based on the push message, the operation requested by the operation request, when the second information identifier is matched with the first information identifier.

When detecting the push message, the electronic device correspondingly stores the push message and the first information identifier of the push message. The push message may be generated by the electronic device based on a target application installed thereon. The push message is correspondingly configured with the first information identifier, and the first information identifier is used for uniquely identifying the push message. With the electronic device being a mobile phone and the target application being WeChat installed on the mobile phone as an example, the push message may be a prompt message pushed from WeChat.

When receiving the second information identifier sent by the wearable device, the electronic device can match the second information identifier with the first information identifier, so as to judge whether a push message identified by the second information identifier is the same as the push message identified by the first information identifier.

The second information identifier being matched with the first information identifier may refer to that the second information identifier is the same as the first information identifier. For example, the operation requested by the operation request can be executed based on the push message, when the second information identifier is the same as the first information identifier. The operation requested by the operation request includes an operation of displaying the push message on the electronic device.

After the first information identifier of the push message, and the push message are obtained, the push message and the first information identifier can be sent to the wearable device.

In some embodiments, firstly, a network connection can be established between the electronic device and the wearable device; and when the network connection between the electronic device and the wearable device is successfully established, the push message received by the electronic device can be synchronized to the wearable device. In this way, the user can see the push message through the wearable device timely. As such, on one hand, the user can see the push message without carrying the electronic device or having the electronic device around; on the other hand, when the electronic device is in sight of but cannot be directly operated by the user conveniently, the user can directly operate, through the wearable device, the push message displayed on the wearable device, so as to control the electronic device. Moreover, the electronic device can also send the first information identifier to the wearable device, so that the wearable device recognizes the push message and stores the push message and the corresponding information identifier.

In some embodiments, the electronic device may receive, from the wearable device, the operation request carrying a second information identifier, wherein the second information identifier is sent by the wearable device when a preset operation acting on display information displayed on the wearable device is detected.

The electronic device, after synchronously sending the push message received thereby to the wearable device, may display the push message on a set interface of the wearable device; and upon seeing the push message, the user, if interested in the push message, may input a preset operation based on the display information displayed on the wearable device, and sends, based on the preset operation, the operation request carrying the second information identifier to the electronic device. The preset operation may be an operation of the user clicking the display information, for example an operation of clicking or double clicking the display information; or the preset operation may be an operation of sliding the display information, for example, an operation of sliding the display information to the left or to the right.

In some embodiments, a selection control can be configured on the set interface on the wearable device; and when needing to open the push message on the electronic device, the user can input a preset operation based on the selection control, and send the second information identifier to the electronic device based on the preset operation. The selection control may be a virtual control displayed on the wearable device, or a physical control installed inside the wearable device.

The electronic device sends the first information identifier to the wearable device and receives the second information identifier from the wearable device, and then executes an operation requested by the operation request based on the push message when the first information identifier is matched with the second information identifier. In the disclosure, identifier authentication is first carried out before executing a corresponding operation on the electronic device based on the wearable device, so that the accuracy and security of executing an operation for a push message on the electronic device based on the wearable device are improved.

In some embodiments, the operation of executing, based on the push message, the operation requested by the operation request, when the second information identifier is matched with the first information identifier includes: the electronic device displays the push message, when the first information identifier is matched with the second information identifier; and displays, on a display interface for the push message, an interface change produced by the operation requested by the operation request.

When the second information identifier is matched with the first information identifier, the push message can be displayed on the display interface of the electronic device, and an interface change produced by the operation requested by the operation request can be simulated. For example, the operation of jumping from the current display interface of the electronic device to a display interface of the target application sending the push message is conducted, and the push message is displayed on the display interface. As such, the interface change produced by the operation requested by the operation request is simulated based on the preset operation acting on the display information displayed on the wearable device. The user can directly execute the operation requested by the operation request, for example opening the push message, on the electronic device based on the preset operation received by the wearable device. Compared with the solution where a user sees a push message on the wearable device and then executes an operation corresponding to the push message on the electronic device, the above embodiments enable the user to quickly process the push message on the electronic device.

In some embodiments, the operation of executing, based on the push message, the operation requested by the operation request includes one of the following:

in response to a target application associated with the push message not having been installed, installing the target application, and entering the installed target application to execute the operation requested by the operation request;

in response to the target application associated with the push message needing to be updated, updating the target application, and entering the updated target application to execute the operation requested by the operation request; or entering the target application associated with the push message to execute the operation requested by the operation request.

If the push message contains information related to the target application to be pushed, then the target application can be installed on the electronic device according to the push message; if the push message contains information related to the target application to be updated, then the target application can be updated on the electronic device according to the push message; or if the push message merely contains content related to the message to be pushed, then the push message can be displayed on a program interface of the target application on the electronic device.

In some embodiments, the operation requested by the operation request is an opening operation, and the operation of executing the operation on the electronic device includes: entering a target application associated with the push message, and opening a display interface for information corresponding to the push message.

The operation requested by the operation request is a deleting operation, and the operation of executing the operation on the electronic device includes: entering the target application associated with the push message, and deleting information corresponding to the push message.

The operation requested by the operation request is a collecting operation, and the operation of executing the operation on the electronic device includes: entering the target application associated with the push message, and collecting information corresponding to the push message to a set storage space.

The operation requested by the operation request is a marking operation, and the operation of executing the operation on the electronic device includes: entering the target application associated with the push message, marking information corresponding to the push message and storing the marked information corresponding to the push message.

Different operations can be executed based on different push content, and compared with the solution where a user sees a push message on the wearable device and then enters an electronic device to execute an operation corresponding to the push message, the above embodiments enable the user to quickly process the push message on the electronic device.

In some embodiments, prior to the operation of executing the operation on the electronic device, the method further includes: unlocking the electronic device.

In some embodiments, the method further includes: receiving user identity information returned by a wearable device; and matching the user identity information with set identity authentication information to obtain an identity matching result.

The operation of unlocking the electronic device includes: if an identity matching result indicates that the user identity information has passed verification, then unlocking the electronic device.

The user identity information may be various types of information indicating whether the user identity is legal, for example, a biological feature of a user, a password set by the user, and various types of numbers allocated to the user. The numbers here include but are not limited to: an identification card number, a passport number or a student card number.

With identity information of a user being fingerprint information as an example, fingerprint information returned by a wearable device can be matched with pre-stored fingerprint information of the user based on the pre-stored fingerprint information; if a matching result indicates consistency, it indicates that the received user identity information is correct, and the identity information of the user has passed verification; and if the matching result indicates non-consistency, then it indicates that the received user identity information is incorrect, and the identity information of the user has failed the verification. If the user identity information has passed the verification, then the electronic device is unlocked.

In embodiments of the disclosure, when the identity information of the user has passed the verification, the electronic device is automatically unlocked; and when the electronic device is successfully unlocked, based on the push message, a corresponding operation is executed. Not only the electronic device can be automatically unlocked and a corresponding operation is executed thereon without an additional operation of the user, but also the security of information interaction can be ensured based on an identity verification process.

After the identity verification is passed, the electronic device is automatically unlocked, and an opening operation for the target application is executed; a set interface of the target application is entered based on the opening operation, and the push message is displayed on the set interface.

Compared with the solution where a user sees a push message on the wearable device and then enters an electronic device to execute an operation corresponding to the push message, the above embodiments enable the user to quickly process the push message on the electronic device.

Figure 2:
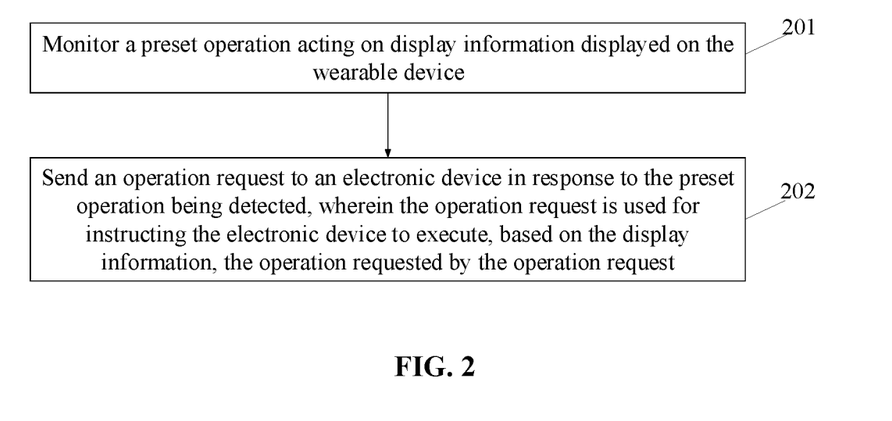
FIG. 2 illustrates a flowchart of another method for information processing according to some embodiments of the disclosure.

FIG. 2 illustrates a flowchart of another method for information processing according to some embodiments of the disclosure. As illustrated in FIG. 2, the method is applied to a wearable device, and includes the following blocks.

In block 201, a preset operation acting on display information displayed on the wearable device is monitored.

In block 202, an operation request is sent to an electronic device in response to the preset operation being detected. The operation request is used for instructing the electronic device to execute, based on the display information, the operation requested by the operation request.

In embodiments of the disclosure, based on a preset operation acting on display information displayed on the wearable device, a simulated user operation acting a push message identified by the first information identifier can be generated, and the user operation can be executed on the electronic device. As such, the user can directly execute the user operation, for example opening the push message, on the electronic device based on the preset operation received by the wearable device. Compared with the solution where a user sees a push message on the wearable device and then enters the electronic device to execute an operation corresponding to the push message, the above embodiments enable the user to quickly process the push message on the electronic device.

In some embodiments, the method further includes: receiving, from the electronic device, a push message and a first information identifier of the push message.

The display information includes the push message sent by the electronic device, the operation request includes a second information identifier of the push message, and the electronic device can match the first information identifier with the second information identifier.

A network connection can be first established between the electronic device and the wearable device; and when the network connection between the electronic device and the wearable device is successfully established, the electronic device may synchronize the received push message to the wearable device. In this way, the user can see the push message through the wearable device timely. Moreover, the wearable device may also receive the first information identifier sent by the electronic device, so that the wearable device can recognize the push message and store the push message and the corresponding information identifier.

In some embodiments, the wearable device may send the operation request carrying a second information identifier to the electronic device. The second information identifier is sent by the wearable device upon detection of a preset operation acting on display information displayed on the wearable device.

The electronic device, after synchronously sending the push message received thereby to the wearable device, may display the push message on a set interface of the wearable device; and upon seeing the push message, the user, if interested in the push message, may input a preset operation based on the display information displayed on the wearable device, and sends, based on the preset operation, the operation request carrying the second information identifier to the electronic device. The preset operation may be an operation of the user clicking the display information, for example an operation of clicking or double clicking the display information; or the preset operation may be an operation of sliding the display information, for example, an operation of sliding the display information to the left or to the right.

In some embodiments, a selection control can be configured on the set interface on the wearable device; and when needing to open the push message on the electronic device, the user can input a preset operation based on the selection control, and send the second information identifier to the electronic device based on the preset operation. The selection control may be a virtual control displayed on the wearable device, or a physical control installed inside the wearable device.

The user can directly execute the operation requested by the operation request, for example opening the push message, towards the electronic device based on the preset operation received by the wearable device. Compared with the solution where a user sees a push message on the wearable device and then enters an electronic device to execute an operation corresponding to the push message, the above embodiment enables the user to quickly process the push message on the electronic device.

Figure 3:
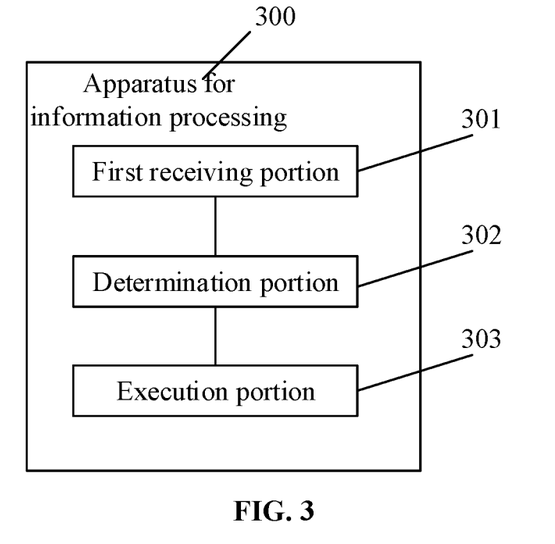
FIG. 3 illustrates a block diagram of an apparatus for information processing according to some embodiments of the disclosure.

FIG. 3 illustrates a block diagram of an apparatus for information processing according to some embodiments of the disclosure. As illustrated in FIG. 3, the apparatus 300 for information processing mainly includes a first receiving portion 301, a determination portion 302, and an execution portion 303. The first receiving portion 301 is configured to receive an operation request from a wearable device. The determination portion 302 is configured to determine an operation, requested by the operation request, to be executed on the electronic device. The execution portion 303 is configured to execute the operation on the electronic device.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In some embodiments, the apparatus 300 further includes a first sending portion, configured to send a first information identifier of a push message, and the push message to the wearable device. The first receiving portion 301 is configured to receive, from the wearable device, the operation request carrying a second information identifier. The execution portion 303 is configured to: execute, based on the push message, the operation requested by the operation request, when the second information identifier is matched with the first information identifier.

In some embodiments, the execution portion 303 is further configured to: enable the electronic device to display the push message, when the first information identifier is matched with the second information identifier; and display, on a display interface for the push message, an interface change produced by the operation requested by the operation request.

In some embodiments, the execution portion 303 is further configured to perform one of the following: in response to a target application associated with the push message not having been installed, install the target application, and enter the installed target application to execute the operation requested by the operation request; in response to the target application associated with the push message needing to be updated, update the target application, and enter the updated target application to execute the operation requested by the operation request; or enter the target application associated with the push message to execute the operation requested by the operation request.

In some embodiments, the operation requested by the operation request is an opening operation, and the execution portion 303 is configured to enter a target application associated with the push message, and open a display interface for information corresponding to the push message.

The operation requested by the operation request is a deleting operation, and the execution portion 303 is configured to: enter the target application associated with the push message, and delete information corresponding to the push message.

The operation requested by the operation request is a collecting operation, and the execution portion 303 is configured to: enter the target application associated with the push message, and collect information corresponding to the push message to a set storage space.

The operation requested by the operation request is a marking operation, and the execution portion 303 is configured to: enter the target application associated with the push message, mark information corresponding to the push message, and store the marked information corresponding to the push message.

In some embodiments, the apparatus 300 further includes an unlocking portion, configured to unlock the electronic device.

Figure 4:
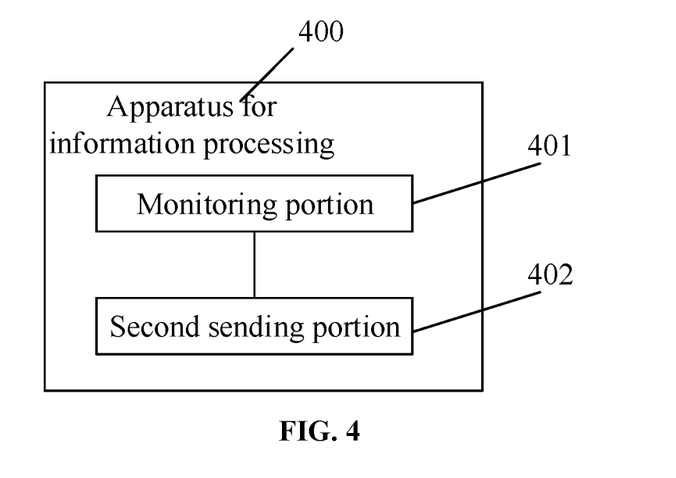
FIG. 4 illustrates a block diagram of another apparatus for information processing according to some embodiments of the disclosure.

FIG. 4 illustrates a block diagram of another apparatus for information processing according to some embodiments of the disclosure. As illustrated in FIG. 4, the apparatus 400 for information processing mainly includes a monitoring portion 401 and a second sending portion 402.

The monitoring portion 401 is configured to monitor a preset operation acting on display information displayed on a wearable device.

The second sending portion 402 is configured to send an operation request to an electronic device in response to the preset operation being detected. The operation request is used for instructing the electronic device to execute, based on the display information, the operation requested by the operation request.

In some embodiments, the apparatus 400 further includes a second receiving portion, configured to receive, from the electronic device, a push message and a first information identifier of the push message.

The display information includes the push message sent by the electronic device, the operation request includes a second information identifier of the push message, and the electronic device can match the first information identifier with the second information identifier.

With regard to the apparatus in the above embodiments, the specific way for the various portions to execute operations has been described in detail in the embodiments regarding the method, which will not be described in detail here.

The technical solutions provided in the embodiments of the disclosure may have the following advantages:

it can be seen from the above technical solutions that, in the disclosure, an electronic device can receive an operation request from a wearable device, determine an operation, requested by the operation request, to be executed on the electronic device, and execute the operation on the electronic device. As such, a user can directly execute, based on the operation request from the wearable device, the corresponding operation, for example opening a push message, on the electronic device, and the user can quickly process the push message on the electronic device through the wearable device.

When the electronic device executes the operation corresponding to a push message of an application installed on the electronic device, the technical solutions provided in the present application have the following benefits. At a first aspect, compared with the solution where a user sees a push message on the wearable device and then enters an electronic device to execute an operation corresponding to the push message, the technical solutions provided in the present application enable the user to quickly process the push message on the electronic device. At a second aspect, by means of the technical solutions provided in the present application, the electronic device can receive an operation request from the wearable device and execute a corresponding operation; as such, the execution of the user operation is achieved in a non-invasive manner, and there is no need for the system of the electronic device to specifically establish an interface with the corresponding application. At a third aspect, since an operation executed by the electronic device is a simulated user operation, operations such as establishing an interface, such as an application programming interface (API), can be conducted during development or installation of a new application. Therefore, the difficulty in developing a new application is reduced, and the degree of coupling between the system and the application is reduced.

Figure 5:
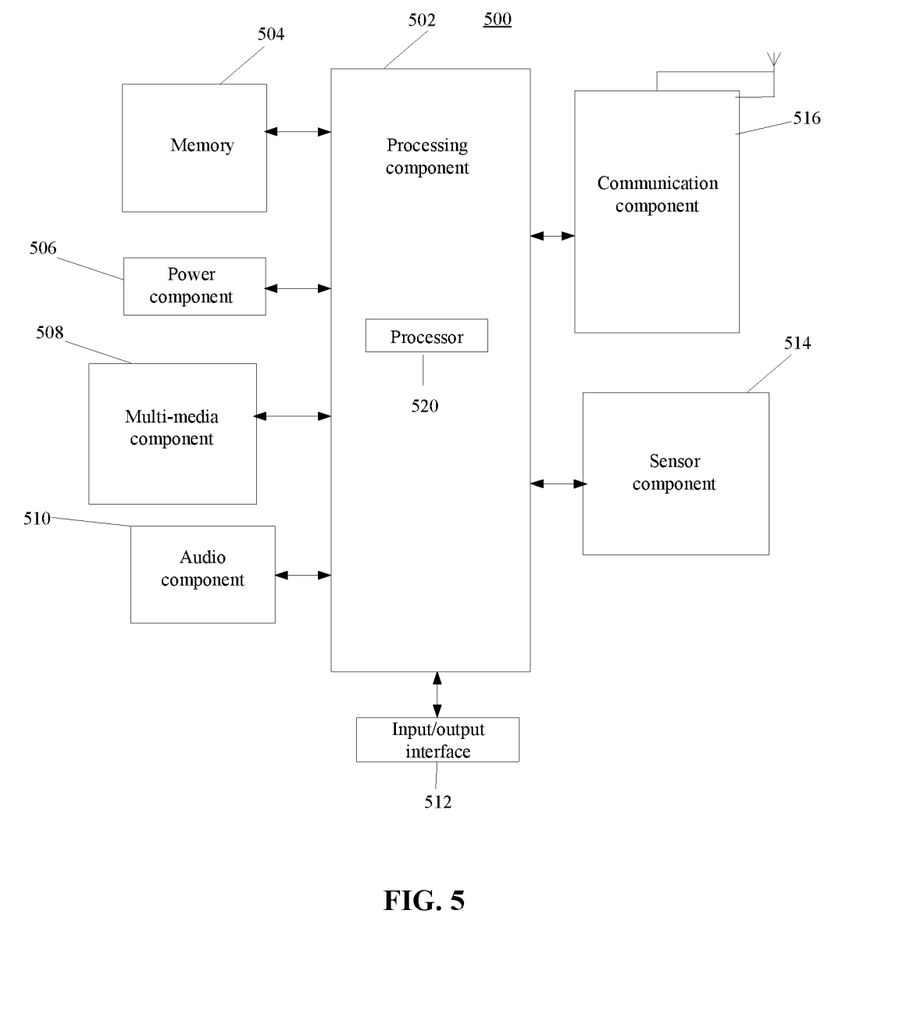
FIG. 5 illustrates a block diagram of the hardware structure of an apparatus for information processing according to some embodiments of the disclosure.

FIG. 5 illustrates a block diagram of the hardware structure of an apparatus 500 for information processing according to some embodiments of the disclosure. For example, the apparatus 500 may be a mobile phone, a computer, a digital broadcast terminal, a message transceiving device, a game console, a tablet device, medical equipment, fitness equipment, a personal digital assistant, etc.

As illustrated in FIG. 5, the apparatus 500 may include one or more of the following: a processing component 502, a memory 504, a power component 506, a multi-media component 508, an audio component 510, an input/output (I/O) interface 512, a sensor component 514, and a communication component 516.

The processing component 502 generally controls the overall operation of the apparatus 500, such as operations associated with display, a phone call, data communication, a camera operation and a recording operation. The processing component 502 may include one or more processors 520 to execute instructions, so as to complete all or some blocks in the methods above. In addition, the processing component 502 may include one or more portions for the interaction between the processing component 502 and the other components. For example, the processing component 502 may include a multi-media portion for interaction between the multi-media component 508 and the processing component 502.

The memory 504 is configured to store various types of data so as to support operations at the apparatus 500. The examples of these types of data include instructions of any application or method for operating on the apparatus 500, contact person data, phone book data, messages, pictures, video, etc. The memory 504 may be implemented by any type of volatile or non-volatile storage device or a combination of both, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 506 supplies power for the various components of the apparatus 500. The power component 506 may include a power management system, one or more power sources, and other components associated with the generation, management and distribution of power for the apparatus 500.

The multi-media component 508 includes a screen serving as an output interface between the apparatus 500 and a user. In some embodiments, the screen may include a liquid crystal display (LCD) and a touch pad (TP). In some embodiments, organic light-emitting diode (OLED) or other types of displays can be employed. If the screen includes a touch pad, then the screen may be implemented as a touch screen so as to receive an input signal from the user. The touch pad includes one or more touch sensors to sense touch, slide and gestures on the touch pad. The touch sensors may not only sense the boundary of a touch or slide action, but also can detect the duration and pressure related to the touch or slide operation. In some embodiments, the multi-media component 508 includes a front camera and/or a rear camera. When the apparatus 500 is in an operating mode, such as a photography mode or a video mode, the front camera and/or the rear camera may receive external multi-media data. Each of the front camera and the rear camera may be a fixed optical lens system or have a focal length or optical zoom capability.

The audio component 510 is configured to output and/or input an audio signal. For example, the audio component 510 includes a microphone (MIC), and when the apparatus 500 is in an operating mode, such as a calling mode, a recording mode and a voice recognition mode, the microphone is configured to receive an external audio signal. The received audio signal can be further stored in the memory 504 or sent via the communication component 516. In some embodiments, the audio component 510 further includes a loudspeaker for outputting an audio signal.

The I/O interface 512 provides an interface between the processing component 502 and a peripheral interface portion, and the above peripheral interface portion may be a keyboard, a click wheel, a button, etc. The button may include but is not limited to a home page button, a volume button, a start button and a locking button.

The sensor component 514 includes one or more sensors for providing state evaluation for the apparatus 500 from various aspects. For example, the sensor component 514 may detect an on/off state of the apparatus 500, and the relative positioning between components; for example the components are a display and keyboard of the apparatus 500. The sensor component 514 may also detect a positional change of the apparatus 500 or a component of the apparatus 500, whether there is contact between a user and the apparatus 500, the orientation or acceleration/deceleration of the apparatus 500, and a temperature change of the apparatus 500. The sensor component 514 may include a proximity sensor configured to detect the existence of an object nearby without any physical contact. The sensor component 514 may also include an optical sensor, such as a CMOS or CCD image sensor, for use in an imaging application. In some embodiments, the sensor component 514 may also include an acceleration sensor, a gyroscope sensor, a magnetic sensor, a pressure sensor or a temperature sensor.

The communication component 516 is configured for wired or wireless communication between the apparatus 500 and another device. The apparatus 500 may access a communication standard based wireless network, such as Wi-Fi, 2G, 3G, 4G, 5G or a combination thereof. In some embodiments of the disclosure, the communication component 516 receives a broadcast signal from an external broadcast management system or broadcasts relevant information through a broadcast channel. In some embodiments of the disclosure, the communication component 516 further comprises a near-field communication (NFC) module for short-range communication. For example, the NFC module may be implemented based on the radio-frequency identification (RFID) technique, the infrared data association (IrDA) technique, the ultra-wide band (UWB) technique, the Bluetooth (BT) technique or others.

In some embodiments of the disclosure, the apparatus 500 may be implemented by one or more application-specific integrated circuits (ASICs), digital signal processors (DSPs), digital signal processing devices (DSPDs), programmable logic devices (PLDs), field programmable gate arrays (FPGAs), controllers, micro-controllers, micro-processors or other electronic elements, for executing the above methods.

In some embodiments of the disclosure, a non-transitory computer-readable storage medium including instructions is also provided, for example a memory 504 including instructions. The above instructions may be executed by the processor 520 of the apparatus 500 to complete the above methods. For example, the non-transitory computer-readable storage medium may be a ROM, a random access memory (RAM), a CD-ROM, a magnetic tape, a floppy disk, an optical data storage device and so on.

For the non-transitory computer-readable storage medium, instructions in the storage medium, when executed by a processor of an electronic device, enable the electronic device to execute a method for information processing, including: receiving an operation request from a wearable device; determining an operation, requested by the operation request, to be executed on the electronic device; and executing the operation on the electronic device.

In some embodiments, the instructions in the storage medium enable the wearable device to execute a method for information processing, including: monitoring a preset operation acting on display information displayed on the wearable device; and sending an operation request to an electronic device in response to the preset operation being detected. The operation request is used for instructing the electronic device to execute, based on the display information, the operation requested by the operation request.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An electronic device, comprising:
a processor; and
a memory, configured to store instructions executable by the processor,
wherein the processor is configured to implement, during execution, a method for information processing, comprising:
receiving, from a wearable device, an operation request comprising request information of an operation requested to be executed on the electronic device;
determining the operation requested to be executed on the electronic device in response to the received operation request;
executing the operation on the electronic device, in response to said determining; and
sending a first information identifier of a push message, and the push message to the wearable device;
wherein the receiving, from the wearable device, the operation request comprising the request information of the operation requested to be executed on the electronic device comprises:
receiving, from the wearable device, the operation request carrying a second information identifier; and
wherein the executing the operation on the electronic device comprises:
executing, based on the push message, the operation requested by the operation request, when the second information identifier is matched with the first information identifier; and
wherein the executing, based on the push message, the operation requested by the operation request comprises one of:
in response to a target application associated with the push message having not been installed, installing the target application, and entering the installed target application to execute the operation requested by the operation request; or
in response to the target application associated with the push message needing to be updated, updating the target application, and entering the updated target application to execute the operation requested by the operation request.

2. The electronic device according to claim 1, wherein the executing, based on the push message, the operation requested by the operation request, when the second information identifier is matched with the first information identifier comprises:
enabling the electronic device to display the push message, when the first information identifier is matched with the second information identifier; and
displaying, on a display interface for the push message, an interface change produced by the operation requested by the operation request.

3. The electronic device according to claim 1, wherein in response to that the operation requested by the operation request is a deleting operation, and executing the operation on the electronic device comprises: entering the target application associated with the push message, and deleting information corresponding to the push message;
wherein in response to that the operation requested by the operation request is a collecting operation, and said executing the operation on the electronic device comprises: entering the target application associated with the push message, and collecting information corresponding to the push message to a set storage space; or
wherein the operation requested by the operation request is a marking operation, and said executing the operation on the electronic device comprises: entering the target application associated with the push message, marking information corresponding to the push message and storing the marked information corresponding to the push message.

4. The electronic device according to claim 1, wherein prior to the executing the operation on the electronic device, the method further comprises:
unlocking the electronic device.

5. A method for information processing, executed by the electronic device according to claim 1, the method comprising:
receiving, from the wearable device, the operation request comprising request information of the operation requested to be executed on the electronic device;
determining the operation requested to be executed on the electronic device in response to the received operation request;
executing the operation on the electronic device, in response to the determination of the operation; and
sending the first information identifier of the push message, and the push message to the wearable device;
wherein the receiving, from the wearable device, the operation request comprising the request information of the operation requested to be executed on the electronic device comprises:
receiving, from the wearable device, the operation request carrying the second information identifier; and
wherein the executing the operation on the electronic device comprises:
executing, based on the push message, the operation requested by the operation request, when the second information identifier is matched with the first information identifier; and
wherein the executing, based on the push message, the operation requested by the operation request comprises one of:
in response to the target application associated with the push message having not been installed, installing the target application, and entering the installed target application to execute the operation requested by the operation request; or in response to the target application associated with the push message needing to be updated, updating the target application, and entering the updated target application to execute the operation requested by the operation request.

6. The method according to claim 5, wherein the executing, based on the push message, the operation requested by the operation request, when the second information identifier is matched with the first information identifier comprises:

enabling the electronic device to display the push message, when the first information identifier is matched with the second information identifier; and displaying, on a display interface for the push message, an interface change produced by the operation requested by the operation request.

7. The method according to claim 5, wherein in response to that the operation requested by the operation request is a deleting operation, and executing the operation on the electronic device comprises: entering the target application associated with the push message, and deleting information corresponding to the push message;

wherein in response to that the operation requested by the operation request is a collecting operation, and executing the operation on the electronic device comprises: entering the target application associated with the push message, and collecting information corresponding to the push message to a set storage space; or wherein in response to that the operation requested by the operation request is a marking operation, and executing the operation on the electronic device comprises: entering the target application associated with the push message, marking information corresponding to the push message and storing the marked information corresponding to the push message.

8. The method according to claim 5, wherein prior to the executing the operation on the electronic device, the method further comprises:

unlocking the electronic device.

9. A non-transitory computer-readable storage medium, wherein instructions in the storage medium, when executed by a processor of an apparatus for information processing, enable the apparatus to execute the method for information processing according to claim 5.

10. A wearable device, comprising:

a processor; and a memory, configured to store instructions executable by the processor, wherein the processor is configured to implement, during execution, a method for information processing, comprising:

monitoring a preset operation acting on display information displayed on the wearable device;

sending an operation request to an electronic device in response to the preset operation being detected, wherein the operation request comprises request information of an operation requested to be executed on the electronic device, and the operation request is used for instructing the electronic device to execute, based on the display information, the operation requested to be executed on the electronic device requested by the operation request; and receiving, from the electronic device, a push message and a first information identifier of the push message, wherein the display information comprises the push message sent by the electronic device, the operation request comprises a second information identifier of the push message, and the electronic device can match the first information identifier with the second information identifier; and wherein the operation request is used for instructing the electronic device to install a target application and enter the installed target application to execute the operation requested by the operation request in response to the target application associated with the push message having not been installed, or update the target application and enter the updated target application to execute the operation requested by the operation request in response to the target application associated with the push message needing to be updated.

11. A method of information processing, executed by a wearable device, and comprising:

monitoring a preset operation acting on display information displayed on the wearable device;

sending an operation request to an electronic device in response to the preset operation being detected, wherein the operation request comprises request information of an operation requested to be executed on the electronic device, and the operation request is used for instructing the electronic device to execute, based on the display information, the operation requested to be executed on the electronic device requested by the operation request; and receiving, from the electronic device, a push message and a first information identifier of the push message, wherein the display information comprises the push message sent by the electronic device, the operation request comprises a second information identifier of the push message, and the electronic device can match the first information identifier with the second information identifier; and wherein the operation request is used for instructing the electronic device to install a target application and enter the installed target application to execute the operation requested by the operation request in response to the target application associated with the push message having not been installed, or update the target application and enter the updated target application to execute the operation requested by the operation request in response to the target application associated with the push message needing to be updated.

12. A non-transitory computer-readable storage medium, wherein instructions in the storage medium, when executed by a processor of an apparatus for information processing, enable the apparatus to execute the method for information processing according to claim 11.

* * * * *